United States Patent [19]

Yoshida et al.

[11] Patent Number: 4,668,649

[45] Date of Patent: May 26, 1987

[54] MODIFIED ZEOLITE

[75] Inventors: Shinichi Yoshida, Kashiwa; Hidehiro Higashi, Kita-Kyushu; Takemithu Yano, Tokyo; Jun Fuchikami, Matsudo, all of Japan

[73] Assignee: Catalysts & Chemicals Industries Co., Ltd., Tokyo, Japan

[21] Appl. No.: 698,308

[22] Filed: Feb. 5, 1985

[51] Int. Cl.$^4$ ............................................. B01J 29/08
[52] U.S. Cl. ...................................................... 502/79
[58] Field of Search ........................................... 502/79

[56] References Cited

U.S. PATENT DOCUMENTS

| 3,402,996 | 9/1968 | Maher et al. | 502/79 X |
| 3,449,070 | 6/1969 | McDaniel et al. | 502/79 X |
| 3,945,943 | 3/1976 | Ward | 502/79 X |

Primary Examiner—Carl F. Dees
Attorney, Agent, or Firm—Flynn, Thiel, Boutell & Tanis

[57] ABSTRACT

As modified zeolite is disclosed here wherein the volume occupied by pores having a diameter ranging from 50 Å to 600 Å measured by the nitrogen gas absorption method is 30% or more of the volume occupied by pores having a diameter ranging from 0 to 600 Å. The catalyst containing this modified zeolite is suitably used especially in hydroprocessing heavy hydrocarbon oil.

5 Claims, No Drawings

MODIFIED ZEOLITE

BACKGROUND OF THE INVENTION

The present invention relates to a zeolite used suitably in hydrotreating heavy oil, in particular a modified zeolite having a distinctive pore size distribution.

In recent years, a world-wide tendency is that crude oil is becoming more and more heavy, and consequently the amounts of sulfurous and nitrogenous compounds, metallic compounds such as nickel, vanadium and the like and, further resinous matter including asphaltenes are increasing conspicuously. On the other hand, there is an increasing demand for light oil such as kerosene and gas oil including desulfurized oil, denitrogenized oil and demetalized oil, which is accompanied with serious problems that the heavy oil of inferior quality is abundant and on the other hand the light oil is in short supply.

In order to cope with the situation like this, a method of hydrotreating heavy oil with a zeolite-containing catalyst has been proposed and put to practical use. However, the pore diameter of the zeolite conventionally used in hydrotreating catalysts is almost about 10 Å. Due to this, when hydrotreating the heavy oil containing high molecular weight compounds such as resinous materials including asphaltenes in large amounts, and further containing large amounts of sulfurous and nitrogenous compounds and metallic contaminants, by the use of the catalyst containing the zeolite of this sort, a satisfactory result can not be obtained because it is difficult to cause the high molecular weight compounds to enter the pores of the zeolite. Further, there was a defect that a large amount of low value gas was produced.

For the purpose of partly modifying a high crystalline zeolite or increasing the $SiO_2/Al_2O_3$ ratio of zeolite, there is proposed a method of treating zeolite with acid in Japanese Patent Publication No. 21802/1976 and Japanese Laid Open Patent Application No. 101003/1978. And, Japanese Patent Publication No. 43782/1981 and Japanese Patent Publication No. 16925/1982 each discloses a method of treating zeolite with steam and thereafter with ammonia. However, these prior art discloses give no heed to the pore size distribution of zeolite. According to our finding, furthermore, these conventional zeolites have no pore size distribution as defined by the present invention and render no satisfactory results in the points of activity, coke deposition and duration of life in hydrotreating heavy oil.

SUMMARY OF THE INVENTION

In view of these prior art problems, our inventors have devoted themselves to studies so as to develop such a zeolite that is highly active for hydrotreating heavy oil and further produces little low value gas, and discovered a modified zeolite that has a high activity peculiar to zeolite as well as holds, in a certain distribution, a large amount of relatively large pores of 50–300 Å not seen in the conventional zeolite. That is, the modified zeolite according to the present invention is characterized by the features that in the pore size distribution measured by the nitrogen gas absorption method (BJH method), the volume occupied by pores having diameters in the range of 50–600 Å is 30% or more of the volume occupied by pores having diameters in the range of 0–600 Å, the average diameter of pores having diameters in the range of 50–600 Å is 110 Å or more, and the volume occupied by pores having diameters in the range of 300–600 Å is 15% or less of the volume occupied by pores having diameters in the range of 0–600 Å.

DETAILED DESCRIPTION

The modified zeolite according to the present invention, which has large diameter pores, permits high molecular weight compounds to disperse within pores of the zeolite. Accordingly, the active sites in pores are utilized effectively so that a large amount of sulfurous and nitrogenous compounds and metallic contaminants such as nickel, vanadium and the like contained in condensed polycyclic aromatics in the oil can be removed from the oil and further heavy oil can be converted into light oil.

The modified zeolite according to the present invention does not hold much pores having an excessive diameter. This intended to prevent asphaltenic high molecular weight compounds, namely coke precursors, from entering pores and thus minimize deactivation of active sites caused by deposition of carbonaceous material thereon. That is, the modified zeolite according to the present invention is a novel one having pores most suitable for treating heavy oil, which permits molecules, whose reaction is desirable, to enter said pores but hinders high molecular weight compounds, whose reaction is not desirable, from entering the pores owing to its limited pore size characteristic.

In a preferred, more limited embodiment, the present invention involves a modified zeolite possessing pore size distribution that the volume occupied by pores having diameters in the range of 50–600 Å is 35%–80% of the volume occupied by pores having diameters in the range of 0–600 Å, the average diameter of pores having diameters in the range of 50–600 Å is 110–250 Å, and the volume occupied by pores having diameters in the range of 300–600 Å is 5% or less of the volume occupied by pores having diameters in the range of 0–600 Å. Further, the preferable modified zeolite of the present invention is the one wherein the lattice constant is 24.30–24.40 Å, the volume occupied by pores having diameters of 600 Å or less is at least 0.35 ml/g, the surface area is at least 400 m$^2$/g, and the alkali metal content is 0.5 wt.% or less as $Na_2O$.

Taking into consideration the fact that conventional zeolite was comprised mainly of pores having diameters of about 10 Å or less, it will be clear that since the zeolite of the present invention is modified so as to have large pores, its effective active sites are increased conspicuously. The modified zeolite having the properties as mentioned above can be obtained by heating an ammonium exchanged Y-type zeolite at 450°–750° C. for 1 hour or more, said ammonium exchanged Y-type zeolite containing for instance 0.5 wt.% or less of sodium as $Na_2O$ and 0.05–1.0 wt.%, preferably 0.07–0.5 wt.% of sulfate ion as S.

One concrete preparation example of the modified zeolite according to the present invention will be given. But, it is to be noted that the present invention should not be limited to those preparation conditions, procedures and the like.

A Y-type zeolite ($SiO_2/Al_2O_3$ molar ratio: about 5.0) containing about 13 wt.% of sodium as $Na_2O$ is treated with an aqueous ammonium sulfate solution (concentration: 0.05–0.5 mol/l), and is calcined at 400°–600° C. The resulting zeolite is treated about twice with an aqueous ammonium sulfate solution (concentration: 0.05-0.5 mol/l), and is washed with 5-10 l of water per Kg of said Y-type zeolite to thereby obtain an ammonium exchanged Y-type zeolite containing 0.5 wt.% or less of sodium as $Na_2O$ and 0.05-0.5 wt.% of sulfate ion as S. The resulting ammonium exchanged Y-type zeolite is treated at 500°-700° C. for 1-4 hours, whereby there is obtained a modified zeolite having an intended distinctive pore size distribution.

In case the sodium content in the ammonium exchanged Y-type zeolite to be subjected to heat-treatment is over 0.5 wt.% as $Na_2O$, the sulfate ion content deviates from the range of 0.05-0.5 wt.% as S, or the treating conditions such as temperatures and time for treating deviate from the above mentioned range, the pores of the zeolite are not enlarged or are too much enlarged, whereby the Y-type zeolite having the pore size distribution as stated in the present invention can not be obtained.

As stated above, the modified zeolite according to the present invention can exhibit very excellent effects, as a catalyst or catalyst carrier or as a component of catalyst carrier, in hydrotreating heavy oil, for instance hydrocracking, catalytic cracking and hydrodesulfurizing heavy oil, due to its peculiar pore size distribution. Above all, the modified zeolite according to the present invention can exhibit superior effects in hydrocracking and catalytic cracking which can obtain the so-called middle fraction such as kerosene and gas oil without obtaining much low value gas from deteriorated oils such as atmospheric residuum, vacuum residuum and the like.

Next, the present invention will be explained more concretely with reference to an Example.

EXAMPLE

A Y-type zeolite ($SiO_2/Al_2O_3$ molar ratio: 5.0) containing 13.0 wt.% of sodium as $Na_2O$ was treated with an aqueous ammonium sulfate (concentration: 0.15 mol/l) and washed with water, and thereafter was calcined at 500° C. for 3 hours. In succession, said Y-type zeolite was subjected to ion exchange with an aqueous ammonium sulfate solution having a concentration of 0.20 mol/l, and then washed with water. Thereafter, the resulting zeolite was again subjected to ion exchange with an aqueous ammonium sulfate having a concentration of 0.25 mol/l, and was washed once with 5 l of water per Kg of said Y-type zeolite.

The thus obtained ammonium exchanged Y-type zeolite (which is called $NH_4 Y$ zeolite in short, hereinafter) was observed to contain 0.35 wt.% of sodium as $Na_2O$ and contain 0.10 wt.% of sulfate ion as S. The properties of this Y-type zeolite will be shown in Column A of Table 1.

Then, said $NH_4 Y$ zeolite was heated at 620° C. for 3 hours to thereby obtain a modified zeolite. The properties of this modified zeolite are shown in Table 1.

COMPARATIVE EXAMPLE 1

A Y-type zeolite ($SiO_2/Al_2O_3$ molar ratio: 5.0) containing 13.0 wt.% of sodium as $Na_2O$ was treated with an aqueous ammonium sulfate solution (concentration: 0.15 mol/l) and then washed with water, and thereafter was calcined at 500° C. for 3 hours. In succession, said Y-type zeolite was subjected to ion exchange with an aqueous ammonium sulfate solution having a concentration of 0.25 mol/l and was washed once with 50 l of water per Kg of said Y-type zeolite.

The thus obtained $NH_4 Y$ zeolite was observed to contain 1.0 wt.% of sodium as $Na_2O$ and contain 0.03 wt.% of sulfate ion as S. Then, this $NH_4 Y$ zeolite was heated at 620° C. for 3 hours to thereby obtain a modified zeolite. The properties of this modified zeolite are shown in Table 1.

COMPARATIVE EXAMPLE 2

A Y-type zeolite ($SiO_2/Al_2O_3$ molar ratio: 5.0) containing 13.0 wt.% of sodium as $Na_2O$ was treated with an aqueous ammonium sulfate (concentration: 0.15 mol/l) and then washed with water, and thereafter was calcinated at 500° C. for 3 hours. In succession, said Y-type zeolite was subjected to ion exchange with an aqueous ammonium sulfate solution having a concentration of 0.20 mol/l and was washed once with 2 l of water per Kg of said Y-type zeolite.

The thus obtained $NH_4 Y$ zeolite was observed to contain 2.1 wt.% of sodium as $Na_2O$ and contain 1.5 wt.% of sulfate ion as S. Then, this $NH_4 Y$ zeolite was heated at 650° C. for 3 hours to thereby obtain a modified zeolite. The properties of this modified zeolite are shown in Table 1.

COMPARATIVE EXAMPLE 3

A Y-type zeolite ($SiO_2/Al_2O_3$ molar ratio: 5.0) containing 13.0 wt.% of sodium as $Na_2O$ was treated with ethylenediaminetetraacetic acid (EDTA) to thereby obtain a modified zeolite having lattice constant of 24.55 Å, $SiO_2/Al_2O_3$ molar ratio of 8.0, and pore volume of 0.43 ml/g. The properties of this modified zeolite are shown in Table 1.

TABLE 1

|  | A | Example | Comparative Example 1 | Comparative Example 2 | Comparative Example 3 |
|---|---|---|---|---|---|
| Volume of pores having diameters of 50-600Å (%) Volume of pores having diameters of 0-600Å | 12 | 37 | 33 | 37 | 21 |
| Average diameter of pores having diameters of 50-600Å | 130Å | 159Å | 101Å | 290Å | 91Å |
| Volume of pores having diameters of 300-600Å (%) Volume of pores having diameters of 0-600Å | 2 | 4 | 3 | 18 | 3 |
| Lattice constant | 24.68Å | 24.35Å | 24.44Å | 24.33Å | 24.55Å |
| Pore Volume (ml/g) | 0.36 | 0.40 | 0.36 | 0.49 | 0.43 |
| Surface area (m²/g) | 627 | 589 | 617 | 611 | 592 |
| $Na_2O$ content (wt. %) | 0.35 | 0.17 | 0.69 | 0.05 | 0.33 |

What is claimed is:

1. A modified zeolite which has been prepared by heating an ammonium cation-exchanged Y-type zeolite containing 0.5 wt. % or less of sodium, calculated as Na$_2$O, and from 0.05 to 1.0 wt. % of sulfate ion, calculated as S, at a temperature of from 450° to 750° C. for at least one hour, until there is obtained the modified zeolite in which:
- (a) the volume occupied by pores having diameters in the range of 50–600 Å is 30% or more of the volume occupied by pores having diameters in the range of 0–600 Å,
- (b) the average diameter of pores having diameters in the range of 50–600 Å is 110 Å or more, and
- (c) the volume occupied by pores having diameters in the range of 300–600 Å is 15% or less of the volume occupied by pores having diameters in the range of 0–600 Å, said modified zeolite having a lattice constant in the range of from 24.30 to 24.40 Å.

2. A modified zeolite according to claim 1 wherein the volume occupied by pores whose diameter is 600 Å or less is at least 0.35 ml/g, and the surface area is at least 400 m$^2$/g.

3. A modified zeolite according to claim 1 in which the volume occupied by pores having diameters in the range of 50–600 Å is 35–80% of the volume occupied by pores having diameters in the range of 0–600 Å, the average diameter of pores having diameters in the range of 50–600 Å is 110–250 Å, and the volume occupied by pores having diameters in the range of 300–600 Å is 5% or less of the volume occupied by pores having diameters in the range of 0–600 Å.

4. A modified zeolite according to claim 2 in which the volume occupied by pores having diameters in the range of 50–600 Å is 35–80% of the volume occupied by pores having diameters in the range of 0–600 Å, the average diameter of pores having diameters in the range of 50–600 Å is 110–250 Å, and the volume occupied by pores having diameters in the range of 300–600 Å is 5% or less of the volume occupied by pores having diameters in the range of 0–600 Å.

5. A modified zeolite according to claim 4 in which said ammonium cation-exchanged zeolite contains from 0.07 to 0.5 wt. % of sulfate ion, calculated as S.

* * * * *